(12) United States Patent
Lindahl et al.

(10) Patent No.: US 8,706,272 B2
(45) Date of Patent: Apr. 22, 2014

(54) ADAPTIVE ENCODING AND COMPRESSION OF AUDIO BROADCAST DATA

(75) Inventors: Aram Lindahl, Menlo Park, CA (US); Richard Michael Powell, Mountain View, CA (US); Joseph M. Williams, Dallas, TX (US)

(73) Assignee: Apple Inc., Cupertino, CA (US)

( * ) Notice: Subject to any disclaimer, the term of this patent is extended or adjusted under 35 U.S.C. 154(b) by 1286 days.

(21) Appl. No.: 12/541,768

(22) Filed: Aug. 14, 2009

(65) Prior Publication Data

US 2011/0039506 A1 Feb. 17, 2011

(51) Int. Cl.
*G06F 17/00* (2006.01)

(52) U.S. Cl.
USPC .............................................. 700/94; 369/7

(58) Field of Classification Search
USPC .............................................. 700/94; 369/7
See application file for complete search history.

(56) References Cited

U.S. PATENT DOCUMENTS

| | | | |
|---|---|---|---|
| 5,083,310 A | 1/1992 | Drory | |
| 5,386,493 A | 1/1995 | Degen et al. | |
| 5,742,599 A | 4/1998 | Lin et al. | |
| 6,573,846 B1 | 6/2003 | Trivedi et al. | |
| 6,606,388 B1 | 8/2003 | Townsend et al. | |
| 7,426,417 B1 | 9/2008 | Cannistraro et al. | |
| 7,430,675 B2 | 9/2008 | Lee | |
| 7,453,938 B2 | 11/2008 | Haskell et al. | |
| 2002/0009289 A1* | 1/2002 | Morishita et al. ............... 386/83 |
| 2003/0163823 A1* | 8/2003 | Logan et al. ..................... 725/89 |
| 2005/0020223 A1* | 1/2005 | Ellis et al. .................. 455/186.1 |
| 2005/0120373 A1* | 6/2005 | Thomas et al. ................. 725/58 |
| 2005/0261900 A1* | 11/2005 | Ojala et al. ..................... 704/223 |
| 2006/0221788 A1 | 10/2006 | Lindahl et al. |
| 2007/0083467 A1 | 4/2007 | Lindahl et al. |
| 2008/0019541 A1* | 1/2008 | Mukaiyama et al. ......... 381/119 |
| 2008/0133956 A1 | 6/2008 | Fadell |
| 2008/0168294 A1 | 7/2008 | Batson et al. |
| 2008/0168470 A1 | 7/2008 | Bushell et al. |
| 2008/0188209 A1 | 8/2008 | Dorogusker et al. |
| 2008/0201587 A1 | 8/2008 | Lee |
| 2009/0003115 A1 | 1/2009 | Lindahl et al. |
| 2009/0005891 A1 | 1/2009 | Batson et al. |

(Continued)

FOREIGN PATENT DOCUMENTS

WO    PCT/US09/43319    5/2009

OTHER PUBLICATIONS

U.S. Appl. No. 12/541,803, filed Aug. 14, 2009, Aram Lindahl.
U.S. Appl. No. 12/541,820, filed Aug. 14, 2009, Aram Lindahl.
U.S. Appl. No. 12/140,976, filed Jun. 17, 2008, Timothy J. Millet.

*Primary Examiner* — Joseph Saunders, Jr.
(74) *Attorney, Agent, or Firm* — Blakely, Sokoloff, Taylor & Zafman LLP

(57) ABSTRACT

Various techniques for adaptively encoding and compressing audio broadcast data to create a digital representation of the broadcast for storage on an electronic device are provided. In one embodiment, the audio broadcast data may be encoded and stored onto the electronic device using a particular codec and/or compression rate, the selection of which may be based upon one or more characteristics of the audio broadcast data signal, such as a genre parameter or a quality parameter. Particularly, the audio broadcast data may be encoded using either a music codec or a speech codec depending upon the genre parameter. Further, some embodiments may also provide for an adjustable compression bit-rate based at least partially upon the quality parameter of the audio broadcast.

29 Claims, 11 Drawing Sheets

(56) References Cited

U.S. PATENT DOCUMENTS

| | | | |
|---|---|---|---|
| 2009/0027355 A1* | 1/2009 | Miller et al. | 345/173 |
| 2009/0060446 A1 | 3/2009 | Holden et al. | |
| 2009/0073005 A1 | 3/2009 | Normile et al. | |
| 2009/0180412 A1 | 7/2009 | Albert et al. | |
| 2009/0185788 A1* | 7/2009 | Lee et al. | 386/83 |

* cited by examiner

ADAPTIVE ENCODING AND COMPRESSION OF AUDIO BROADCAST DATA

BACKGROUND

The present disclosure relates generally to the storage and playback of audio broadcast data and, more specifically, to various techniques for adaptive encoding and compression based upon one or more characteristics of the audio broadcast data.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Radio programming, which may include both terrestrial broadcasts (e.g., AM, FM) and satellite broadcasts (e.g., XM Satellite Radio and Sirius Satellite Radio, both currently operated by Sirius XM, Inc., of New York City, N.Y.), typically broadcasts a wide variety of content, such as music, talk shows, sporting events, news programs, comedy programs, and drama programs, to name just a few. Further, with the exception of some subscription-based satellite radio services, most radio broadcasts are generally free of cost and readily accessible through most electronic devices that include an appropriate receiver, such as an antenna, and tuning components for selecting a particular radio frequency or band of frequencies. For instance, electronic devices that provide for the playback of radio programs may include non-portable electronic devices, such as a stereo system in a home or automobile, as well as portable electronic devices, such as portable digital media players having integrated radio antenna(s) and tuners. Accordingly, due to the diversity of available programming content and the relative ease of access to radio broadcasts, many individuals listen to the radio throughout the day as a form of entertainment (e.g., sporting events, talk shows) or leisure (e.g., music broadcasting), or for informative purposes (e.g., news reports).

Typically, radio programming follows a predetermined broadcast schedule, such that each program is broadcast at a particular scheduled or designated time. Thus, in order to listen to a live broadcast (e.g., in real-time) of a particular radio program, an individual would generally need to be tuned to the particular station at the scheduled time of the radio program. However, there may be times at which an individual may not be able to tune in a particular radio program at its designated broadcast time. As such, it may be convenient to provide techniques by which radio broadcasts may be stored on an electronic device for playback at a later time. Further, due to power and storage limitations on some electronic devices, particularly portable digital media players, it may also be beneficial to provide an adaptive encoding and/or compression technique that may help to conserve power usage and storage space.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for adaptively encoding and compressing audio broadcast data to create a digital representation of the broadcast for storage on an electronic device. For instance, in certain embodiments, audio broadcast data may be encoded and stored onto the electronic device using a particular codec and/or compression rate, the selection of which may be based upon one or more characteristics of the audio broadcast data, such as a genre parameter or a quality parameter. In one embodiment, the audio broadcast data may be encoded using a music codec or a speech codec depending upon the genre parameter. Additionally, some embodiments may also provide for an adjustable compression bit-rate based at least partially upon a quality parameter of the audio broadcast data, such as signal strength. In a further embodiment, the electronic device may include a minimum quality threshold and, if the quality parameter falls below the threshold, the encoding/compression of the broadcast data may be temporarily halted, at least until it is determined that the quality of the signal increases to at least surpass the minimum quality threshold. As will be appreciated, one or more aspects of the adaptive encoding and compression techniques described herein may be configured via user preference settings on the electronic device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
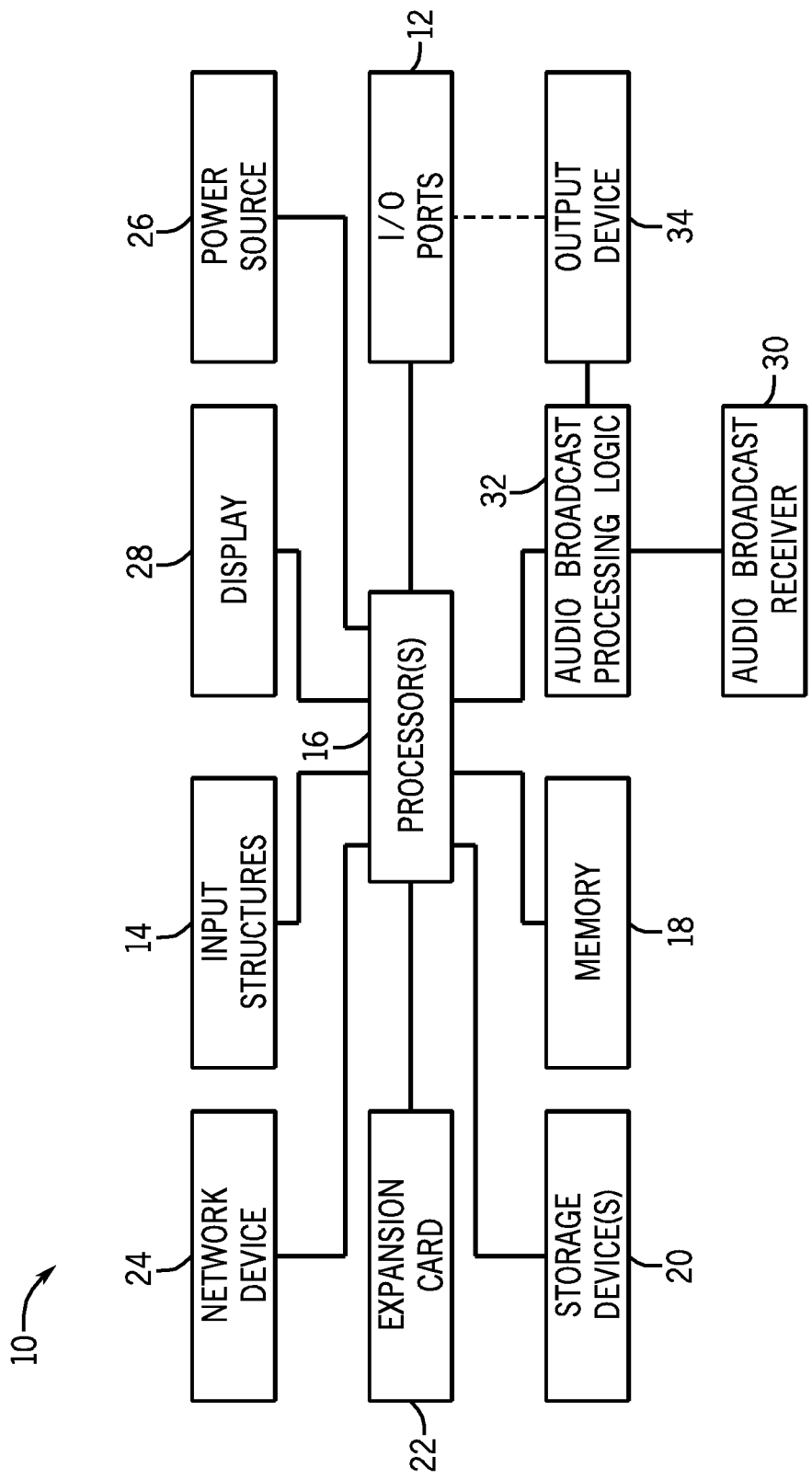
FIG. 1 is a simplified block diagram depicting components of an example of an electronic device that includes circuitry configured to adaptively process and store audio broadcast data, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed below, the present disclosure generally provides various techniques for adaptively encoding and compressing audio broadcast data create a digital representation of the broadcast for storage on an electronic device. For instance, in certain embodiments, audio broadcast data may be encoded and stored onto the electronic device using a particular codec and/or compression rate, the selection of which may be based upon one or more characteristics of the audio broadcast data signal. For example, in one embodiment, an audio broadcast signal may be analyzed as it is received to determine one or more characteristics, such as a genre parameter and/or a quality parameter of the signal. For instance, the electronic device may adaptively select a particular coder-decoder ("codec") that is suited for encoding and compressing the audio broadcast data based upon the determined genre parameter. By way of example, if the genre parameter indicates that the broadcast data is music, a music codec may be selected, and if the genre parameter indicates that the broadcast is speech, a speech codec may be selected.

The genre parameter may be determined using any suitable technique, such as by analyzing broadcast metadata information (e.g., in a RDS or AMSS signal), or by examining the frequency content of the signal. Additionally, in broadcasts that include both music and speech portions (e.g., a broadcast of a live concert followed by commentary), the codec utilized by the electronic device for encoding the audio broadcast may be adjusted as changes in the genre parameter are detected.

The analysis of the broadcast signal may also determine a quality parameter, such as the signal strength of the broadcast. Based at least partially on the quality parameter, an appropriate compression bit-rate may be selected. For instance, if the analysis indicates that the signal strength is high, the broadcast signal may be compressed using a high bit-rate, such as between 192-320 kilobits per second (kbps). If the analysis indicates the signal strength is weak, the compression bit-rate may be lowered, such as to 32-96 kbps, since there is marginal value to utilizing a high-quality bit-rate when compressing low quality portions of the broadcast. Further, utilizing a lower compression bit-rate when signal quality is weak may reduce processing demands, as well as the quantity of data that is sampled, thereby consuming less power and storage space. In this manner, the compression bit-rate may be adaptive in response to the quality of the broadcast signal. In a further embodiment, the electronic device may include a minimum quality threshold and, if the quality parameter falls below the threshold, the encoding/compression of the broadcast data may be temporarily halted, at least until it is determined that the quality of the signal increases to at least surpass the minimum quality threshold.

In further embodiments, the encoding and/or compression of the audio broadcast data may further be dependent upon one or more user-configured preferences. For instance, a user of an electronic device may establish preferences with regard to music and speech codecs used, as well as whether to encode the broadcast data in stereo or mono channels. Additionally, the user may also define one or more actions that may be implemented by the electronic device when power levels (e.g., a battery level) have decreased to below a certain charge threshold.

Before continuing, several of the terms mentioned above, which will be used extensively throughout the present disclosure, will be first defined in order to facilitate a better understanding of disclosed subject matter. For instance, as used herein, the term "audio broadcast" shall be understood to encompass both terrestrial broadcasts (e.g., via frequency modulation (FM) or amplitude modulation (AM)) and satellite broadcasts (e.g., via satellite radio providers, such as XM Satellite Radio® and Sirius Satellite Radio®, both currently operated by Sirius XM, Inc.). Additionally, it should be understood that FM and AM broadcasting may include both conventional analog broadcasting, as well as newer digital terrestrial broadcast standards, such as HD Radio® (e.g., using in-band on-channel (IBOC) technologies) or FMeXtra®, for example. Additionally, an audio broadcast could also be an audio portion of a media broadcast that also includes video (e.g., live audio commentary during a televised sporting event).

Additionally, the term "broadcast metadata" or the like should be understood to refer to one or more of various sub-carrier signal formats often transmitted with an audio broadcast and may contain additional information about the audio broadcast data. By way of example only, broadcast metadata could refer to a Radio Data System (RDS) data signal, which are typically broadcasted with an FM signal, an Amplitude Modulation Signaling System (AMSS) data signal, which are typically broadcasted with an AM signal, or Program Associated Data (PAD) and Program Service Data (PSD) data signals, which are typically broadcasted with digital radio signals (e.g., satellite or IBOC broadcasting).

Further, the term "live," as applied to radio broadcasts, should be understood to mean the act of transmitting radio waves representing a particular radio program, which may be accomplished using terrestrial radio towers, satellites, or through a network (e.g., the Internet). A live broadcast may correspond to substantially real-time events (e.g., news report, live commentary from a sporting event or concert) or to previously recorded data (e.g. replay of an earlier-recorded talk show program). Thus, to be clear, while the actual content of the broadcasted audio data does not necessarily correspond to live events (e.g., occurring in substantially real-time), the transmission of the broadcasted audio data is "live" in the sense that such transmissions are occurring in substantially real-time.

Keeping the above points in mind, FIG. 1 is a block diagram illustrating an example of an electronic device 10 that may include circuitry for adaptively encoding/compressing audio broadcast data, in accordance with one embodiment of the present disclosure. For instance, electronic device 10 may be any type of electronic device that includes a receiver (e.g., 30) configured to receive audio broadcast data, such as a portable media player, a laptop, a mobile phone, or the like. By way of example only, electronic device 10 may be a portable electronic device, such as a model of an iPod® or iPhone® available from Apple Inc. of Cupertino, Calif. In another embodiment, electronic device 10 may be a desktop or laptop computer, including a MacBook®, MacBook® Pro, MacBook Air®, iMac®, Mac® Mini, or Mac Pro®, also available from Apple Inc., that incorporates an audio broadcast receiver (e.g., 30). In further embodiments, electronic device 10 may be a model of an electronic device from another manufacturer that is capable of receiving and processing audio broadcast data. As will be discussed further below, electronic device 10 may be configured to encode, compress, and store audio broadcast data, which may be obtained during a live audio broadcast and accessed for playback at a later time.

As shown in FIG. 1, electronic device 10 may include various internal and/or external components which contribute to the function of device 10. Those of ordinary skill in the art will appreciate that the various functional blocks shown in FIG. 1 may comprise hardware elements (including circuitry), software elements (including computer code stored on a computer-readable medium) or a combination of both hardware and software elements. It should further be noted that FIG. 1 is merely one example of a particular implementation and is intended to illustrate the types of components that may be present in electronic device 10. For example, in the presently illustrated embodiment, these components may include input/output (I/O) ports 12, input structures 14, one or more processors 16, memory device 18, non-volatile storage 20, expansion card(s) 22, networking device 24, power source 26, display 28, audio broadcast receiver 30, audio broadcast processing logic 32, and audio output device 34.

I/O ports 12 may include ports configured to connect to a variety of external devices, including audio output device 34. In one embodiment, output device 34 may include headphones or speakers, and I/O ports 12 may include an audio input port configured to couple output device 34 to electronic device 10. By way of example, I/O ports 12, in one embodiment, may include one or more ports in accordance with various audio connector standards, such as a 2.5 mm port, a 3.5 mm port, or a 6.35 mm (¼ inch) port, or a combination of such audio ports. Additionally, I/O port 12 may include a proprietary port from Apple Inc. that may function to charge power source 26 (which may include one or more rechargeable batteries) of device 10, or transfer data between device 10 from an external source.

Input structures 14 may provide user input or feedback to processor(s) 16. For instance, input structures 14 may be configured to control one or more functions of electronic device 10, applications running on electronic device 10, and/or any interfaces or devices connected to or used by electronic device 10. By way of example only, input structures 14 may include buttons, sliders, switches, control pads, keys, knobs, scroll wheels, keyboards, mice, touchpads, and so forth, or some combination thereof. In one embodiment, input structures 14 may allow a user to navigate a graphical user interface (GUI) of a media player application running on device 10. Further, in certain embodiments, input structures 14 may include a touch sensitive mechanism provided in conjunction with display 28. In such embodiments, a user may select or interact with displayed interface elements via the touch sensitive mechanism.

Processor(s) 16 may include one or more microprocessors, such as one or more "general-purpose" microprocessors, one or more application-specific processors (ASICs), or a combination of such processing components. For example, processor 16 may include one or more instruction set processors (e.g., RISC), as well as graphics/video processors, audio processors and/or other related chipsets. For example, processor(s) 16 may provide the processing capability to execute the media player application mentioned above, and to provide for the playback of digital media stored on the device (e.g., in storage device 20). In one embodiment, processor(s) 16 may also include one or more digital signal processors (DSP) for encoding, compressing, and/or encrypting audio data, such as audio broadcast data received via receiver 30.

Instructions or data to be processed by processor(s) 16 may be stored in memory 18, which may be a volatile memory, such as random access memory (RAM), or as a non-volatile memory, such as read-only memory (ROM), or as a combination of RAM and ROM devices. For example, memory 18 may store firmware for electronic device 10, such as a basic input/output system (BIOS), an operating system, various programs, applications, or any other routines that may be executed on electronic device 10, including user interface functions, processor functions, and so forth. In addition, memory 18 may be used for buffering or caching during operation of electronic device 10, such as for caching audio broadcast data prior to encoding and compression by audio broadcast processing logic 32.

Additionally, the components may further include other forms of computer-readable media, such as non-volatile storage device 20, for persistent storage of data and/or instructions. Non-volatile storage 20 may include flash memory, a hard drive, or any other optical, magnetic, and/or solid-state storage media. By way of example, non-volatile storage 20 may be used to store data files, including audio data, video data, pictures, as well as any other suitable data. As will be discussed further below, non-volatile storage 20 may be utilized by device 10 in conjunction with audio broadcast receiver 30 and audio broadcast processing logic 32 for the storage of audio broadcast data.

The components depicted in FIG. 1 further include network device 24, which may be a network controller or a network interface card (NIC). For example, network device 24 may provide for network connectivity over any wireless 802.11 standard or any other suitable networking standard, such as a local area network (LAN), a wide area network (WAN), such as an Enhanced Data Rates for GSM Evolution (EDGE) network or a 3G data network (e.g., based on the IMT-2000 standard), or the Internet. In certain embodiments, network device 24 may provide for a connection to an online digital media content provider, such as the iTunes® music service, available from Apple Inc., or may be used to access, stream, or download Internet-based radio broadcasts (e.g., podcasts).

Display 28 may be used to display various images generated by the device 10, including a GUI for an operating system or for the above-mentioned media player application to facilitate the playback of media data, including audio broadcast data stored using an adaptive encoding/compression scheme provided by audio broadcast processing logic 32. Display 28 may be any suitable display such as a liquid crystal display (LCD), plasma display, or an organic light emitting diode (OLED) display, for example. Additionally, display 28 may be provided in conjunction with a touch screen that may function as part of a control interface for device 10.

As mentioned above, electronic device 10 may include receiver 30, which may be configured to receive live audio broadcast data. For example, in one embodiment, receiver 30 may include one or more antennas configured to receive analog (e.g., AM and FM broadcasts) and digital (e.g., satellite radio or HD Radio®) broadcast signals. In another embodiment, receiver 30 may, in conjunction with network device 24, further be configured to receive digital audio broadcasts transmitted over a network, such as the Internet, though it should be understood that such broadcasts may be on-demand, and may not always constitute live broadcasts, as defined above. Additionally, it should be understood that receiver 30 may include tuning components to enable device 10 to select a desired signal from a particular radio frequency.

Audio broadcast data received by receiver 30 may be further processed by audio broadcast processing logic 32 for live playback through the output device 34 which, as discussed above, may include speakers integrated with electronic device 10 or an external audio output device (e.g., external speakers or headphones) coupled to one of I/O ports 12. Additionally, processing logic 32 may, in addition to or instead of providing for live playback, store a digital representation of the audio broadcast data for subsequent playback at a later time. As generally discussed above, audio broadcast processing logic 32 may be configured to adaptively encode, compress, and/or encrypt audio broadcast data received by receiver 30. For instance, processing logic 32 may be configured to analyze the received audio broadcast data and/or an associated sub-carrier signal containing broadcast metadata, to determine a genre parameter and one or more quality parameters. Depending on whether the genre parameter indicates that the audio broadcast data contains music or speech, processing logic 32 may encode the audio broadcast data using either a music or speech codec. Additionally, based upon the one or more quality parameters determined from the analysis of the audio broadcast signal, processing logic 32 may select an appropriate compression bit-rate. In this manner, the encoding/compression of the broadcast data into a digital form may be substantially optimized based upon the genre and quality parameters. These features will be discussed in further detail with respect to the various embodiments described below.

Figure 2:
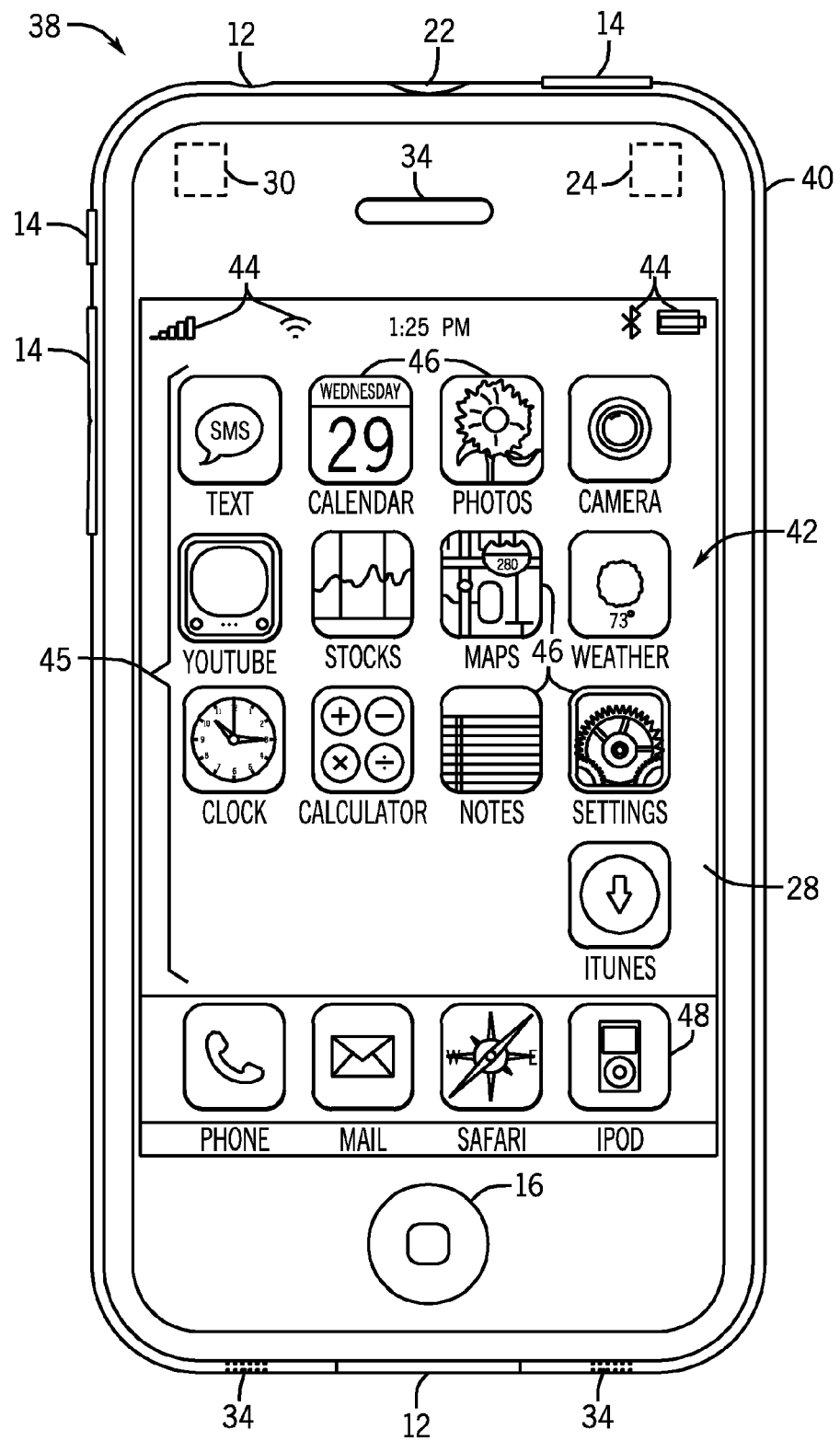
FIG. 2 is a front view of a handheld electronic device, in accordance with aspects of the present disclosure.

Referring now to FIG. 2, electronic device 10 is illustrated in the form of portable handheld electronic device 38. For instance, portable handheld electronic device 38 may be a model of an iPod® or iPhone® available from Apple Inc. It should be understood that while the illustrated handheld device 38 is generally described in the context of portable digital media player and/or cellular phone, additional embodiments of handheld device 38 may incorporate the additional functionalities, such as a camera, a portable gaming platform, a personal data organizer, or some combination thereof. Thus, depending on the functionalities provided by handheld electronic device 38, a user may listen to music, play video games, take pictures, and place telephone calls, while moving freely with handheld device 38.

In the depicted embodiment, handheld device 38 includes enclosure 40, which may function to protect the interior components from physical damage and shield them from electromagnetic interference. Enclosure 40 may be formed from any suitable material or combination of materials, such as plastic, metal, or a composite material, and may allow certain frequencies of electromagnetic radiation, such as radio carrier and sub-carrier signals or wireless networking signals, to pass through to audio broadcast receiver 30 or to wireless communication circuitry (e.g., network device 24), both of which may be disposed within enclosure 40, as shown in FIG. 2. As will be discussed further below, audio broadcast data received by audio broadcast receiver 30 may be played back on electronic device 10 as a live audio stream through audio output device 34, and may also be simultaneously buffered, encoded, and/or compressed (e.g., via audio broadcast processing logic 32), and stored onto device 10 for subsequent playback at a later time.

As shown in the present embodiment, enclosure 40 includes user input structures 14 through which a user may interface with handheld device 38. For instance, each input structure 14 may be configured to control one or more respective device functions when pressed or actuated. By way of example, one or more of input structures 14 may be configured to invoke a "home" screen 42 or menu to be displayed, to toggle between a sleep, wake, or powered on/off mode, to silence a ringer for a cellular phone application, to increase or decrease a volume output, and so forth. It should be understood that the illustrated input structures 14 are merely exemplary, and that handheld device 38 may include any number of suitable user input structures existing in various forms including buttons, switches, keys, knobs, scroll wheels, and so forth.

In the illustrated embodiment, handheld device 38 includes display 28 in the form of a liquid crystal display (LCD). The LCD 28 may display various images generated by handheld device 38. For example, the LCD 28 may display various system indicators 44 providing feedback to a user with regard to one or more states of handheld device 38, such as power status, signal strength, external device connections, and so forth. LCD 28 may also display graphical user interface ("GUI") 45 that allows a user to interact with handheld device 38. GUI 45 may include various layers, windows, screens, templates, or other graphical elements that may be displayed in all, or a portion, of LCD 28. For instance, as shown on home screen 42, GUI 45 may include graphical elements representing applications and functions of device 38. The graphical elements may include icons 46, which may correspond to various applications that may be opened or executed upon detecting a user selection of a respective icon 46. By way of example, one of the icons 46 may represent a media player application 48, which may provide for the playback of digital audio and video data stored on device 38, as well as the playback of stored or live audio broadcast data. In some embodiments, the selection of an icon 46 may lead to a hierarchical navigation process, such that selection of an icon 46 leads to a screen that includes one or more additional icons or other GUI elements. As will be appreciated, icons 46 may be selected via a touch screen included in display 28, or may be selected using one of user input structures 14.

Figure 3:
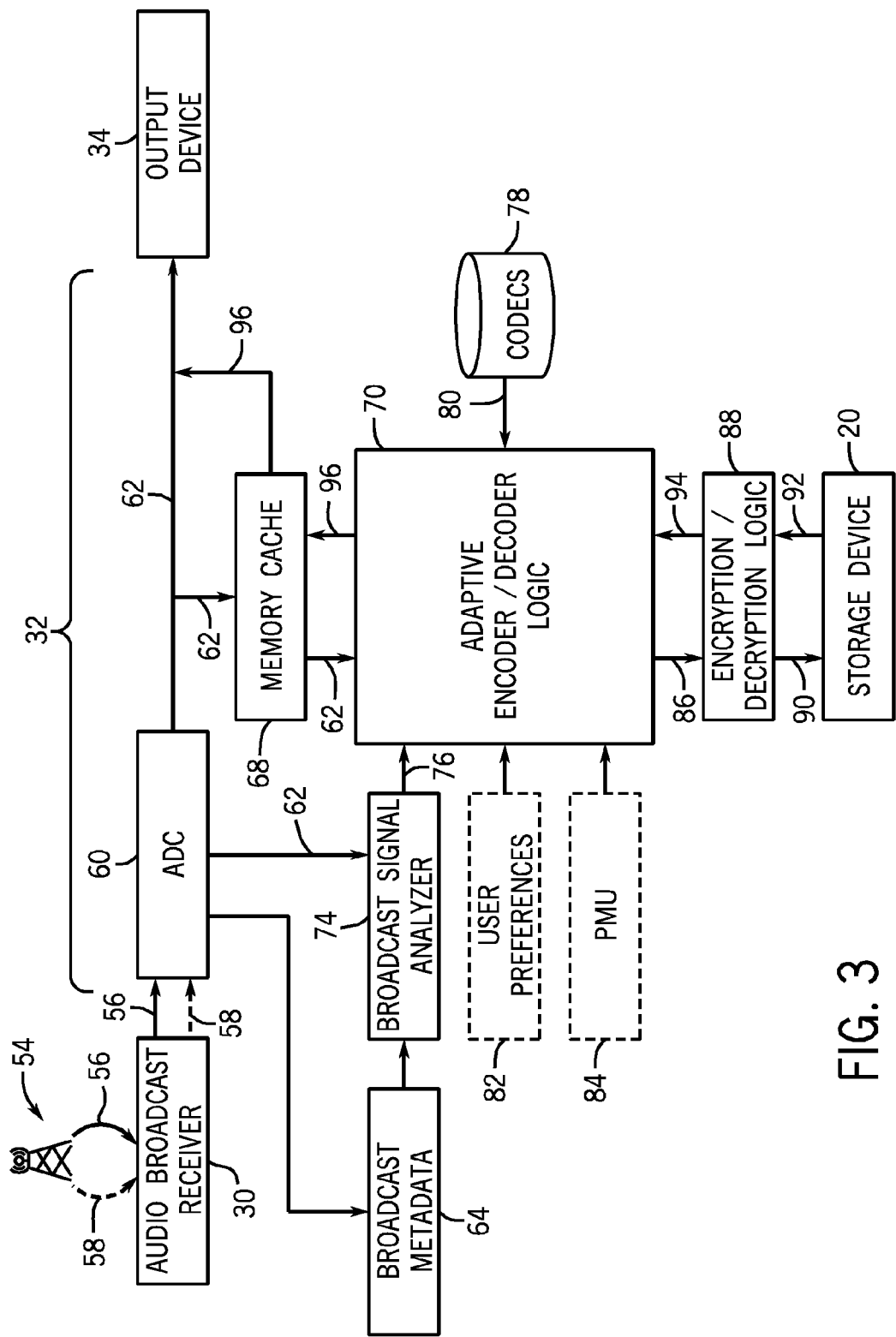
FIG. 3 is a more detailed block diagram showing processing logic that may be implemented in the electronic device of FIG. 1 or 2 for adaptively processing audio broadcast data, in accordance with aspects of the present disclosure.

Referring to FIG. 3, a more detailed view of an example of audio broadcast processing logic 32 is illustrated, in accordance with one embodiment. As mentioned above, audio broadcast processing logic 32 may be configured to adaptively encode and compress audio broadcast data, while also providing for live playback of the audio broadcast data. For instance, as shown in FIG. 3, audio broadcast processing logic 32 may communicate with receiver 30 that receives audio broadcast signals 56, as well as associated sub-carrier broadcast metadata signals 58, from broadcasting station 54, which may be a terrestrial radio tower or a satellite. Processing logic 32 may provide for the adaptive encoding and/or compression of the received audio broadcast data into a digital representation that may be stored on electronic device 10 for later playback. Additionally, processing logic 32 may also provide for live playback of the audio broadcast by routing the broadcast signal to output device 34. It should be understood that the encoding, compression, and storage of the audio broadcast by processing logic 32 may occur independently of live playback through output device 34. For instance, processing logic 32 may encode and store the audio broadcast with or without live playback, and a user may subsequently access the stored audio broadcast for playback at a later time. To provide one example, processing logic 32 may continue to encode and store a live broadcast for later playback while a user is currently listening to a previously stored audio broadcast via output device 34.

As shown in FIG. 3, audio broadcast signal 56 and associated broadcast metadata signal 58 are received by electronic device 10 using receiver 30. Where the signals 56 and 58 are received as analog signals, such as via conventional FM and AM broadcast signals, analog-to-digital converter 60 may be provided for conversion of signals 56 and 58 into respective digital equivalents 62 and 64. Alternatively, where the audio broadcast 56 and metadata 58 signals are transmitted digitally from source 54, such as by way of satellite broadcasting or through the use of digital FM or AM broadcasting technologies (e.g., IBOC, HD Radio®), the digital signals may be processed directly by processing logic 32 (e.g., without use of analog-to-digital converter 60).

As discussed above, digital audio broadcast data 62 may be encoded, compressed, and stored onto device 10 either concurrently with or independently of live playback through output device 34. As part of the encoding process, digital audio broadcast data 62 is first buffered in memory cache 68. Memory cache 68 may be a dedicated memory within processing logic 32, or may be part of memory device 18 of electronic device 10. The buffered broadcast data 62 is then sent to adaptive encoder/decoder logic 70, which may be configured to implement the adaptive encoding and compression techniques mentioned above. For instance, encoding and compression of audio broadcast data 62 may be adaptive depending on one or more characteristics 76 of the audio broadcast data 62, which may be determined by broadcast signal analyzer logic 74.

In one embodiment, the determined characteristics 76 may include a genre parameter or a quality parameter, or a combination thereof. For instance, a genre parameter may be determined either by analyzing broadcast metadata signal 64 to determine whether a particular program is a music-based program (e.g., music broadcasts, live concert broadcasts) or a speech-based program (e.g., talk show). By way of example, broadcast metadata signal 64 may be transmitted using any suitable sub-carrier signal format, such as a Radio Data System (RDS) data signal (typically sent with FM broadcasts), an Amplitude Modulation Signaling System (AMSS) data signal (typically send with AM broadcasts), or Program Associated Data (PAD) and Program Service Data (PSD) data signals (typically utilized in digital broadcasts, such as satellite or IBOC). Additionally, the genre parameter may also be determined by analyzing the frequency characteristics of audio broadcast data 62 (e.g., via spectral or cepstral analysis) to determine whether the audio broadcast data 62 exhibits music-like or speech-like characteristics. Thus, an exact or particular type of music genre may not necessarily be important in the presently disclosed embodiments, as long as a distinction may be determined between speech-based and music-based broadcasts.

Based on the determined genre parameter, adaptive encoder/decoder logic 70 may select a codec that is optimized for either music or speech encoding. For instance, as shown in FIG. 3, adaptive encoder/decoder logic 70 may select, based upon a genre parameter (e.g., 76) an appropriate codec 80 from a plurality of stored codecs 78, whereby selected codec 80 is used to encode audio broadcast data 62. As will be appreciated, codecs 78 may be stored in a separate dedicated storage device, or as part of main storage device 20 of electronic device 10. By way of example only, codecs 78 available to encoder/decoder logic 70 may include various music encoding formats, such as Advanced Audio Coding (AAC or HE-ACC), Apple Lossless Audio Codec (ALAC), Ogg Vorbis, MP3, MP3Pro, MP4, Windows Media Audio, or any suitable music encoding format. Codecs 78 may also include speech encoding techniques, such as an Adaptive Multi-Rate (AMR) codec, Variable Multi-Rate (VMR) codec, Code Excited Linear Prediction (CELP) codec, a Speex codec, or any other suitable type of speech encoding format. As will be discussed further below, in certain embodiments, a user may select preferred speech and music codecs by configuring one or more user preference settings, represented here by reference number 82, which may be part of a radio and/or media player application (e.g., 48) executed on device 10.

Audio broadcast data characteristics 76, as determined by broadcast signal analyzer logic 74, may also determine a quality parameter. As will be appreciated, the quality parameter may be determined using any suitable metric, such as by analyzing signal strength, white-noise content, distortion levels, artifacts, etc., of audio broadcast data signal 62. For instance, where device 10 is a portable handheld device (e.g., device 38), the quality of audio broadcast signal 56, which may be a terrestrial AM or FM transmission, may vary as the location of device 10 change relative to the location of broadcast source 54, due to interference with other over-the-air signals, or due to certain weather conditions. Additionally, where audio broadcast signal 56 is a digital satellite broadcast, the quality (e.g., strength) of signal 56 may become weaker in certain locations, such as when the device 10 is in a parking garage, a tunnel, or any other covered structures that may at least partially obstruct line-of-sight between a satellite source and device 10.

The determined quality parameter may then be utilized by adaptive encoder/decoder logic 70 may also select or adjust a compression bit-rate when encoding audio broadcast data 62. For instance, when the quality parameter indicates a high quality audio broadcast signal 62 (e.g., high signal strength), a higher compression bit-rate may be selected, in order to preserve transparency or near-transparency of the original audio broadcast signal 62 during portions of the broadcast in which the signal strength is high. When the quality parameter indicates a lower quality audio broadcast signal 62, the compression bit-rate may be reduced accordingly, since the benefits of encoding a low quality signal using high compression bit-rates may be marginal. Additionally, by utilizing a lower compression bit-rate for low quality portions of the broadcast data, storage space (e.g., in storage 20) may be saved and processing demands (e.g., processor(s) 16) may be reduced, thereby reducing power consumption and increasing battery life of device 10. In one embodiment, adaptive encoder/decoder logic 70 may select a compression bit-rate based upon a binning scheme, whereby the quality parameter is determined and binned, and an appropriate bit-rate is selected based upon the binning. For example, the binning scheme may include a "high quality" bin, a "medium quality" bin, and a "low quality" bin, with different compression bit-rates corresponding to each bin. Such embodiments will be described in more detail with reference to the description of FIG. 7 below.

As will be appreciated, the selection of compression bit-rates based upon the quality parameter may also be at least partially dependent on the above-discussed genre parameter. For example, when compared to music data, speech data may generally be encoded at lower rates (e.g., relative to music signals), and may even be encoded as having a single audio channel (e.g., mono), as opposed to having multiple audio channels (e.g., stereo), as is generally preferred with music data, while still preserving an acceptable intelligible digital representation of the originally broadcasted speech data. Accordingly, the compression bit-rates selected for speech and music data may vary, even if the quality of the speech and music data is approximately the same. That is, the respective compression bit-rates applied to music and speech data having roughly the same quality may differ.

Adaptive encoding and decoding of audio broadcast data 62 may also be at least partially dependent upon device power data, represented in FIG. 3 by reference number 84, which may be provided to adaptive encoder/decoder logic 70 by a power management unit of device 10. Power data 84 may include information relating to the available charge left in a power source, such as power source 26. Through user preferences 82, a user may configure adaptive encoder/decoder logic 70 to respond to certain low power events, such as when it is detected that the available charge left in power source 26 is below a particular charge threshold. By way of example only, where a user is both using device 10 to simultaneously listen to and encode a live broadcast of data 62, device 10 may be configured (e.g., via user preferences 82) to stop encoding and storing broadcast data 62 when available power falls below a certain charge threshold, i.e., 10 percent, thus allowing the live broadcast to continue for an additional period of time. Thus, although the user may not be able to replay the un-encoded and un-stored portions of the broadcast data 62 at a later time, the user may at least be able to experience the live broadcast. Thus, to summarize, encoder/decoder logic 70 may be configured to adaptively encode, compress, and store audio broadcast data 62 based upon a quality parameter and/or genre parameter of audio broadcast signal 62, a power state 84 of device 10, or user preferences 82, or some combination thereof.

Once broadcast data 62 is encoded and/or compressed, encoded broadcast data 86 may be encrypted prior to being stored on electronic device 10. As can be appreciated, encryption of encoded broadcast data 86 may be applied to prevent circumvention of copyright and other related legal issues. Accordingly, processing logic 32 may include encryption/decryption logic 88, which may be configured to encrypt encoded broadcast data 86. In certain embodiments, encryption/decryption logic 88 may perform encryption/decryption based upon the Advanced Encryption Standard (AES), the Data Encryption Standard (DES), or any other suitable encryption technique. Encrypted broadcast data 90 may then be stored in non-volatile storage device 20. As discussed above, non-volatile storage 20, in some embodiments, may include a flash memory device, such as a NAND flash memory. In such embodiments, one or more wear-leveling techniques may be utilized by the flash memory device, such that erasures and writes are distributed evenly across the flash memory arrays, thereby preventing premature block failures due to a high concentration of writes to one particular area.

As further shown in FIG. 3, in addition to encoding, compressing, and encrypting the audio broadcast data 62, processing logic 32 may also provide for the decryption, decompression, and decoding of stored audio broadcast data, referred to here by reference number 92, for playback on electronic device 10, such as through audio output device 34. For instance, upon selection of stored audio broadcast data 92 for playback, data 92 is first decrypted by encryption/decryption logic 88. Decrypted data 94 may then be decoded and/or decompressed by encoder/decoder logic 70. For instance, encoder/decoder logic 70 may decode and decompress data 94 using the codec and compression bit-rate that was initially used to encode and compress the audio broadcast data 62. The decoded and decompressed data 96 may then be buffered in memory cache 68. Though not shown in FIG. 3, those skilled in the art will appreciate that some embodiments may also include digital-to-analog conversion circuitry for converting decoded data 96 into an analog signal prior to being output to audio output device 34.

The adaptive encoding and compression techniques discussed above may be further illustrated with reference to FIG. 4, which shows a flowchart depicting a method 100 for adaptive encoding and compression of audio broadcast data, in accordance with aspects of the present disclosure. For instance, method 100 may be implemented by audio broadcast processing logic 32, as discussed above in FIG. 3. Method 100 initially begins at step 102, wherein an audio broadcast signal is received. For instance, step 102 may include receiving an analog (e.g., AM or FM signal) or a digital (e.g., satellite, HD Radio®) broadcast signal, such as via receiver 30 of electronic device 10.

Next, method 100 may continue to steps 104 and 106. At step 104, the audio broadcast signal received at step 102 is analyzed for the determination of a genre parameter, which may indicate that the broadcast signal is either music-based or speech-based. Based upon the genre parameter, processing logic 32 may select a music or speech codec for encoding the audio broadcast signal. Additionally, at step 106, which may be performed concurrently with step 104, as shown in FIG. 4, or sequentially in other embodiments, the broadcast signal is analyzed to determine a quality parameter. As discussed above, the quality parameter may be determined using any suitable metric, such as signal strength, white-noise content, distortion levels, artifacts, etc.

Thereafter, at step 108, the quality parameter from step 106 may be compared against a minimum threshold, which may be set in user preferences 82 (FIG. 3) or preset by the manufacturer of electronic device 10. For instance, the minimum threshold may indicate a quality level by which is it difficult or impracticable to attain an intelligible digital representation of the audio broadcast signal. Thus, if the quality parameter is below the minimum threshold, method 100 continues to step 110, and electronic device 10 may stop encoding and storing the audio broadcast data. From step 110, method 100 may return to initial step 102, whereby method 100 may continue to analyze the broadcast signal until it is determined by step 108 that the quality parameter meets or exceeds the minimum threshold.

If it is determined at step 108 that the quality parameter meets or exceeds the minimum quality threshold, method 100 continues to step 112, wherein a compression bit-rate is selected based upon the quality parameter. To provide a general example, a higher compression bit-rate (e.g., between 192-320 kbps) may be selected for high quality signals. The compression bit-rate may, however, be lowered or adjusted accordingly as signal quality changes over time. For instance, the quality of the audio broadcast signal may vary over time due to a change in position of the device 10 relative to the location of a broadcast source (e.g., source 54), such as a radio tower or satellite, or due to natural conditions (e.g., weather, geological, etc.) or interference that may affect the transmission of signals over the air. As mentioned above, in one embodiment, the selection of the compression bit-rate may be based upon a binning scheme, as will be described below with reference to FIG. 7.

Following the selection of the compression bit-rate in step 112, method 100 continues to step 114, whereby the broadcast data is encoded and compressed based upon the selected codec (step 104) and the selected compression bit-rate. Next, at step 116, the encoded and compressed data may be encrypted, such as by using an AES encryption technique. The encrypted data may then be stored into a storage device (e.g., 20) on electronic device 10, as indicated by step 118, where it may be accessed by a user for playback at a later time. Thereafter, method 100 may return to initial step 102, and continue the adaptive encoding/compression process as the audio broadcast signal continues to be received by electronic device 10.

Figure 4:
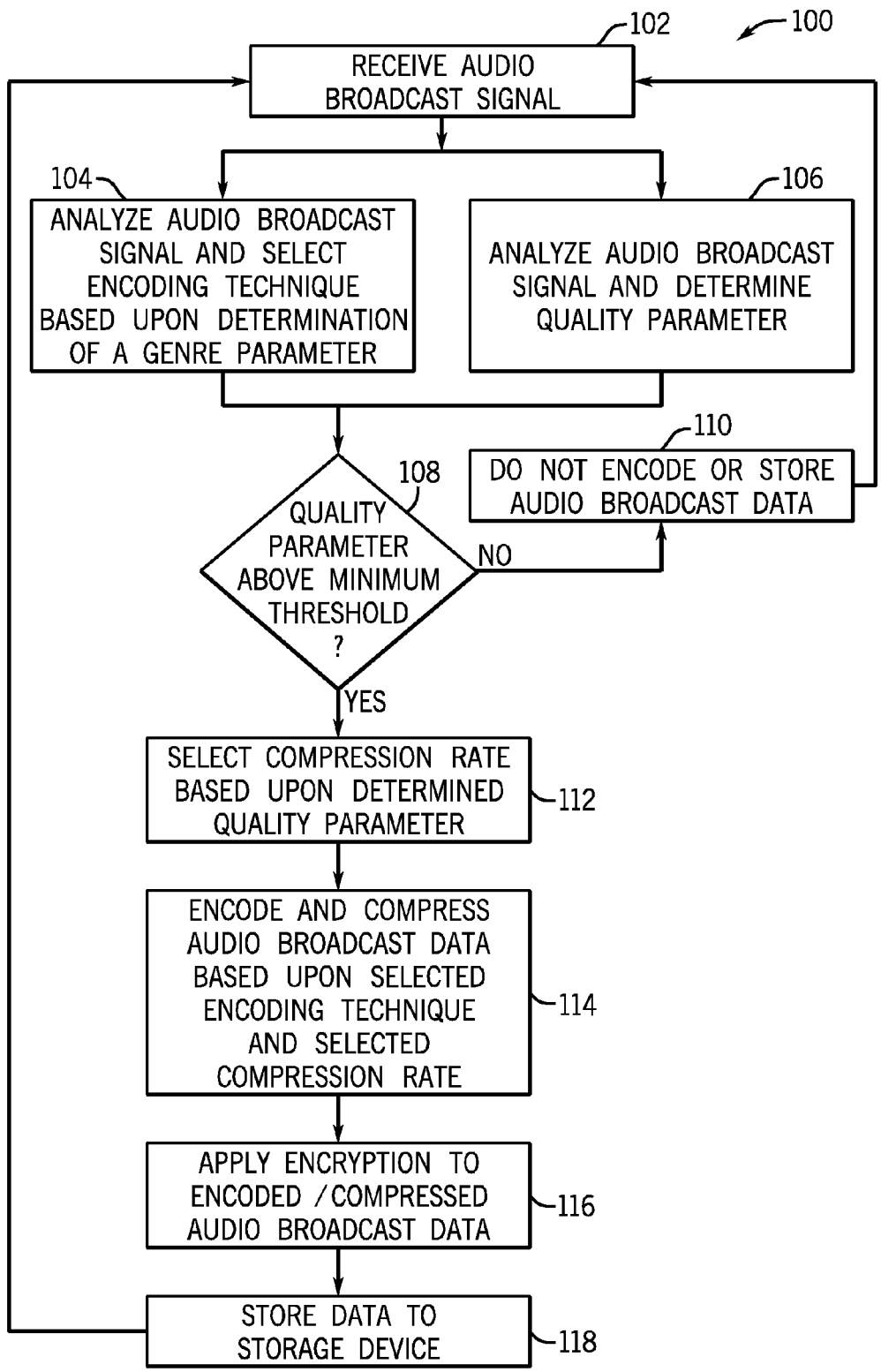
FIG. 4 is a flow chart depicting a process for adaptively encoding and compressing audio broadcast data, in accordance with aspects of the present disclosure.
Figure 5:
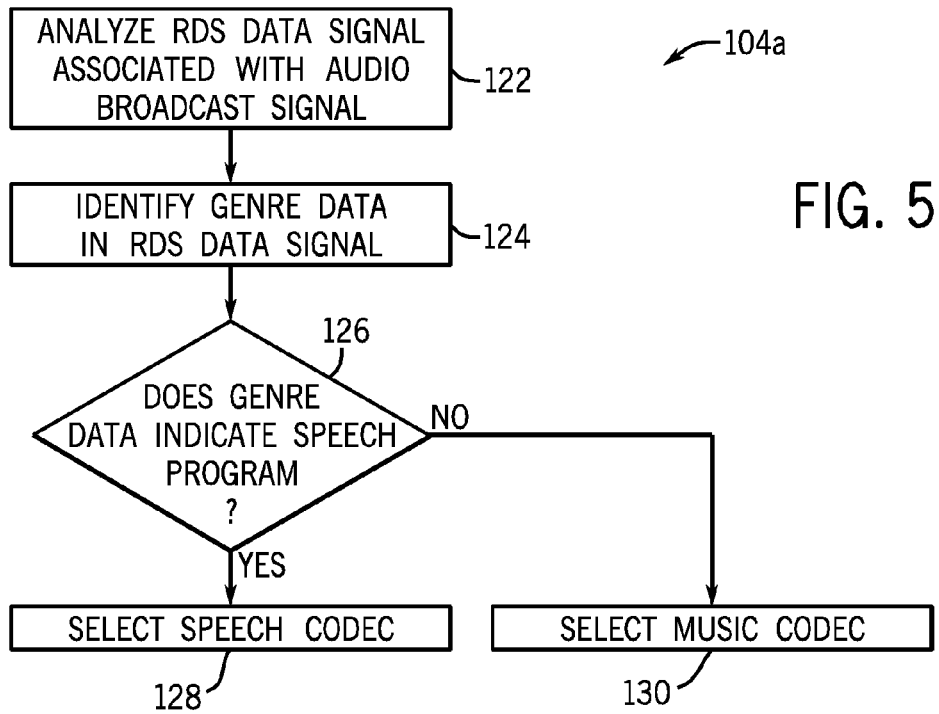
FIG. 5 is a flow chart depicting a process for identifying a genre parameter based upon broadcast metadata information, in accordance with aspects of the present disclosure.
Figure 6:
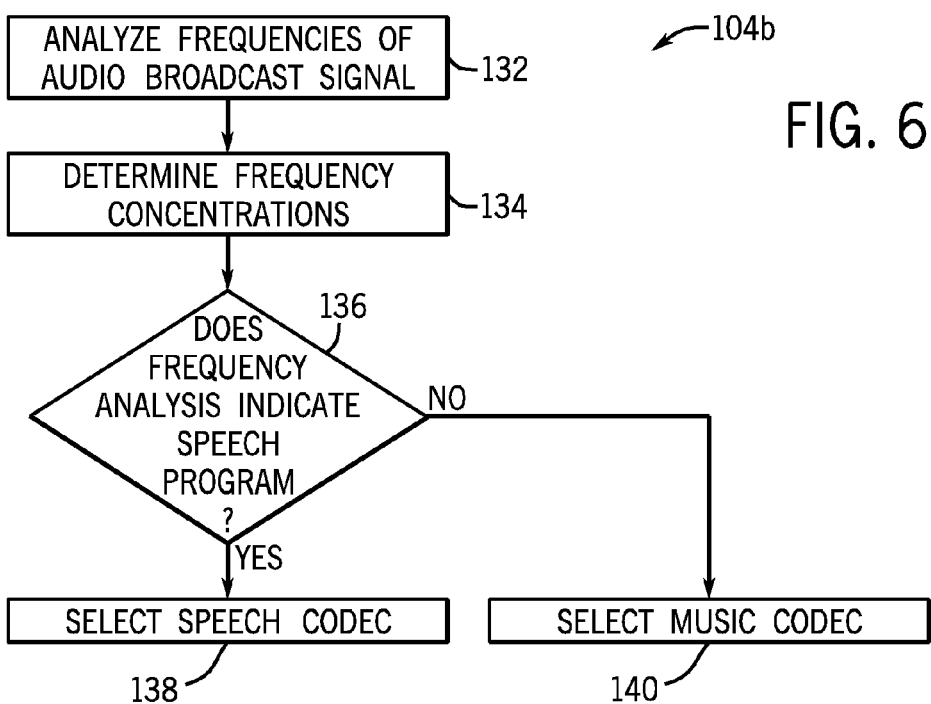
FIG. 6 is a flow chart depicting a process for identifying a genre parameter based upon a frequency analysis of the audio broadcast data, in accordance with aspects of the present disclosure.

The determination of a genre parameter of an audio broadcast signal, as shown by step 104 of FIG. 4, may be accomplished using several techniques. For instance, FIGS. 5 and 6 illustrate two methods that may be used in performing step 104 of method 100. Specifically, FIG. 5 depicts a process 104a by which the genre parameter is determined by analyzing broadcast metadata, such as an RDS signal. FIG. 6 depicts a process 104b by which the genre parameter is determined by frequency analysis of the received broadcast signal.

Referring first to FIG. 5, method 104a begins with step 122, at which an RDS signal associated with the audio broadcast (typically an FM broadcast) is analyzed. As will be appreciated, an RDS signal is generally transmitted as a sub-carrier signal at 57 kHz along with an associated FM signal. The RDS format may provide for various information fields, which may provide for the identification of a broadcasting station, station call letters, alternate frequencies, as well as a program type (PTY field). For instance, in one implementation, the PTY field in an RDS signal may provide for a number of pre-defined program types (PTY1 through PTY31). Thus, at step 124, a genre parameter may be identified by parsing or otherwise extracting this programming information (e.g., genre data) from the RDS signal. Next, at step 126, a determination is made as to whether the extracted genre data indicates that the audio broadcast is a speech-based program. If the genre data indicates a speech-based program, such as a talk show program, then a speech codec (e.g., AMR, VMR, CELP, etc.) is selected at step 128. Alternatively, if the genre indicates a music-based program, then a music codec (e.g., AAC, MP3, etc.) is selected at step 130. Again, it should be understood, that the exact type of music or speech may not necessarily be important in the present example as long as a distinction may be determined between speech-based and music-based. Further, although process 104a makes specific reference to the RDS metadata format, it should be understood that process 104a may be applied to any suitable type of metadata signal, including AMSS signals (AM broadcasts) and PAD signals or PSD signals (digital broadcasts).

While the process illustrated in FIG. 5 may be utilized in instances where broadcast metadata information is available, there may also be instances where the audio broadcast is transmitted without an associated metadata signal. In such instances, genre information may be determined using one or more frequency analysis techniques, such as spectral or cepstral analysis. Referring now to process 104b of FIG. 6, the frequencies of the audio broadcast signal are analyzed at step 132. By way of example, the audio broadcast signal may be analyzed in a range from 0-22 kHz (Nyquist frequency) in 1 kHz increments. This analysis may determine the bands at which the frequencies are most concentrated, as indicated by step 134. At step 136, a determination is made as to whether the frequency analysis result from step 134 is indicative of speech-based data. For instance, speech-like tones are generally concentrated in the 0-6 kHz range. Therefore, if the frequencies are concentrated within a typical speech-like range (e.g., 0-6 kHz), then the portion of the audio broadcast being analyzed may be identified as a speech-based broadcast, and a speech codec may be selected at step 138. Additionally, if the frequencies are more spread out over the larger range, then the portion of the audio broadcast being analyzed may be identified as a music-based broadcast, and a music codec may be selected at step 140.

Figure 7:
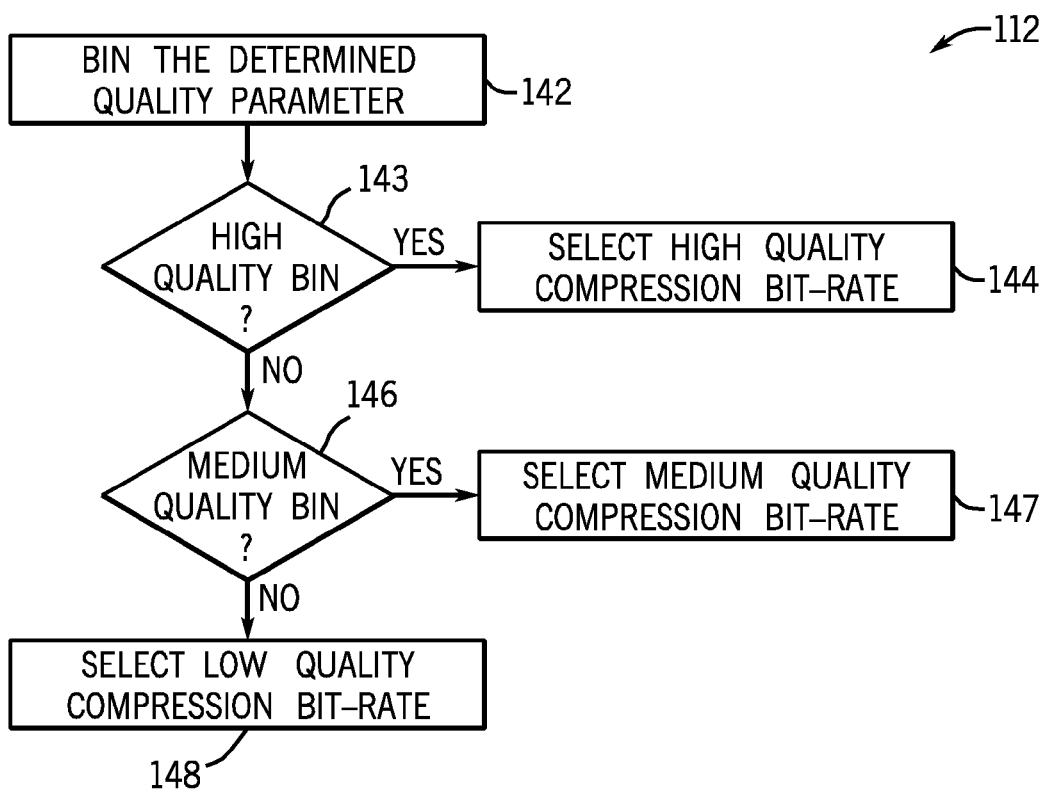
FIG. 7 is a flow chart depicting a process for selecting a compression bit-rate by binning a quality parameter of an audio broadcast signal against a set of binning thresholds, in accordance with aspects of the present disclosure.

Continuing to FIG. 7, a binning process that may be performed at step 112 of method 100 (FIG. 4) is illustrated and provided as one embodiment of a technique for selecting a compression bit-rate based upon a determined quality parameter of an audio broadcast signal. The binning process may begin at step 142, wherein the quality parameter determined at step 106 of method 100 is binned against a plurality of binning thresholds. For example, in the presently illustrated embodiment, adaptive encoder/decoder logic 70 may be configured to bin the determine quality parameter based on a three-level "high quality," "medium quality," and "low quality" binning scheme. For instance, if the determined quality parameter falls into the high quality bin at decision step 143, then the process continues to step 144, wherein adaptive encoder/decoder logic 70 may select a compression bit-rate that corresponds to the high quality bin. By way of example, a high quality compression bit-rate may be between approximately 192 to 320 kbps.

If the determined quality parameter does not fall in the high quality bin at step 143, the process continues to step 146, in which it is determined as to whether the quality parameter falls into the medium quality bin. As mentioned above, a quality parameter, such as signal strength, may vary depending on the position of device 10 relative to a broadcasting source (e.g., 54). Thus, if the quality parameter falls into the medium quality bin at decision step 146, the process continues to step 147, wherein adaptive encoder/decoder logic 70 may select a compression bit-rate corresponding to the medium high quality bin (e.g., between approximately 128 to 160 kbps). If, at step 146, the quality parameter does not bin to the medium quality setting, then the process deduces that the quality parameter is in the low quality bin, and adaptive encoder/decoder logic 70 may select a low quality compression bit-rate (e.g., between 32 to 96 kbps), as shown at step 148. While the presently illustrated embodiment depicts a three-level binning scheme, it should be understood that additional embodiments may utilize more or fewer binning levels.

Further, as mentioned above, respective compression bit-rates applied to music and speech data having roughly the same quality may differ due to the relative ease of reproducing speech data compared to reproducing music data. For example, a speech signal may be compressed using a bit-rate that is lower than a music signal of approximately the same quality while still producing a digital representation of the speech signal that is comparable to the original signal in terms of quality. Thus, in some embodiments, a first set of binning thresholds may be selected when the genre parameter indicates a speech signal, and a second set of binning thresholds may be applied when the genre parameter indicates a music signal.

Figure 8:
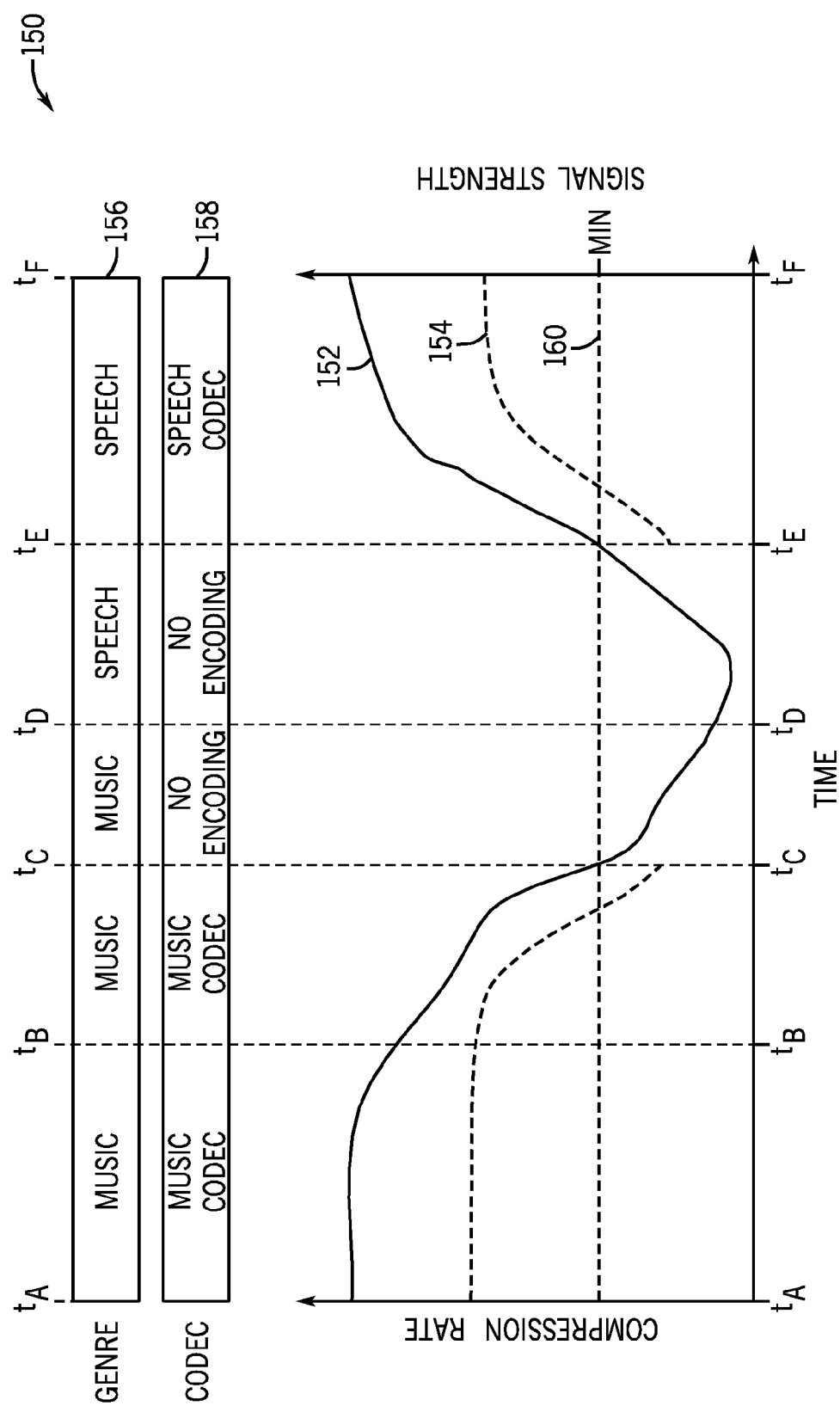
FIG. 8 is a graphical depiction showing the encoding and compression of an audio broadcast signal over an interval of time, in accordance with aspects of the present disclosure.

Turning now to FIG. 8, a graphical depiction 150 of the adaptive encoding and compression techniques discussed above is illustrated. Graph 150 includes trace line 152, which represents the signal strength (e.g., a quality parameter) of an audio broadcast signal over the time interval $t_{AF}$. Graph 150 also includes trace line 154, which represents compression bit-rates selected (e.g., via adaptive encoder/decoder logic 70) over interval $t_{AF}$ based upon the quality parameter data 152. Additionally, graph 150 includes genre information 156 corresponding to the audio broadcast, which may be used to select a particular codec, as indicated by reference number 158. Genre information 156 may be determined based on broadcast metadata (e.g., RDS) or by using the frequency analysis techniques discussed in FIG. 6.

As shown in FIG. 8, during interval $t_{AB}$, the audio broadcast may be a music program, and the overall signal strength of the broadcast signal is generally high. Thus, during interval $t_{AB}$, adaptive encoder/decoder 70 may select a music codec and a high quality compression bit-rate. During the interval $t_{BC}$, the broadcasted music program continues and, thus, adaptive encoder/decoder 70 may continue to utilize a music codec for encoding purposes. However, as indicated by trace line 152, the signal strength begins to decrease over interval $t_{BC}$. For instance, beginning at time $t_B$, the signal strength gradually decreases until it reaches a minimum quality threshold at time $t_C$. As discussed above, variations in the signal strength of the audio broadcast may be influenced by a number of factors, such as the position of device 10 relative to the broadcast source, interference with other over-the-air signals, weather conditions, and so forth. Based upon the change in signal strength, however, the compression bit-rate is adjusted accordingly. For example, as shown in interval $t_{BC}$, the compression bit-rate generally decreases as the signal strength of the audio broadcast decreases.

Subsequently, during interval $t_{CD}$, the signal strength remains below the minimum threshold. As discussed above, this may cause the encoding of the audio broadcast data to temporarily stop, as it may be impractical to maintain an intelligible digital representation of the audio broadcast at such low signal strengths. Consequently, no encoding is performed during interval $t_{CD}$. Continuing to interval $t_{DE}$, the signal strength of the broadcast begins to increase, but still remains below the minimum threshold. As such, no encoding is performed during interval $t_{DE}$. It should be noted, however, that during interval $t_{DE}$, the broadcast changes from being a music program to a speech program. As will be appreciated, this transition may be the end of one program and the start of a new program, or may be a portion of speech, such as DJ chatter or commercials, in between music portions of the current program. Finally, during interval $t_{EF}$, the signal strength increases above the minimum threshold and, therefore, encoding of the audio broadcast may resume. Particularly, the signal strength continues to increase up to time $t_F$. Accordingly, the compression bit-rate may increase accordingly. Further, because the portion of the broadcast during interval $t_{EF}$ has been identified as a speech program, a speech codec may be selected for encoding this portion of the broadcast. As discussed, in certain embodiments, speech data may be compressed using a bit-rate that is lower than a music signal of approximately the same quality while still retaining a digital representation of the speech signal that is comparable to the original speech signal in terms of quality. Thus, even for portions of the broadcast in intervals $t_{AB}$ and $t_{EF}$ that exhibit roughly the same signal strength, different compression bit-rates may be selected due to the differing genres of the broadcast during these intervals.

Figure 9:
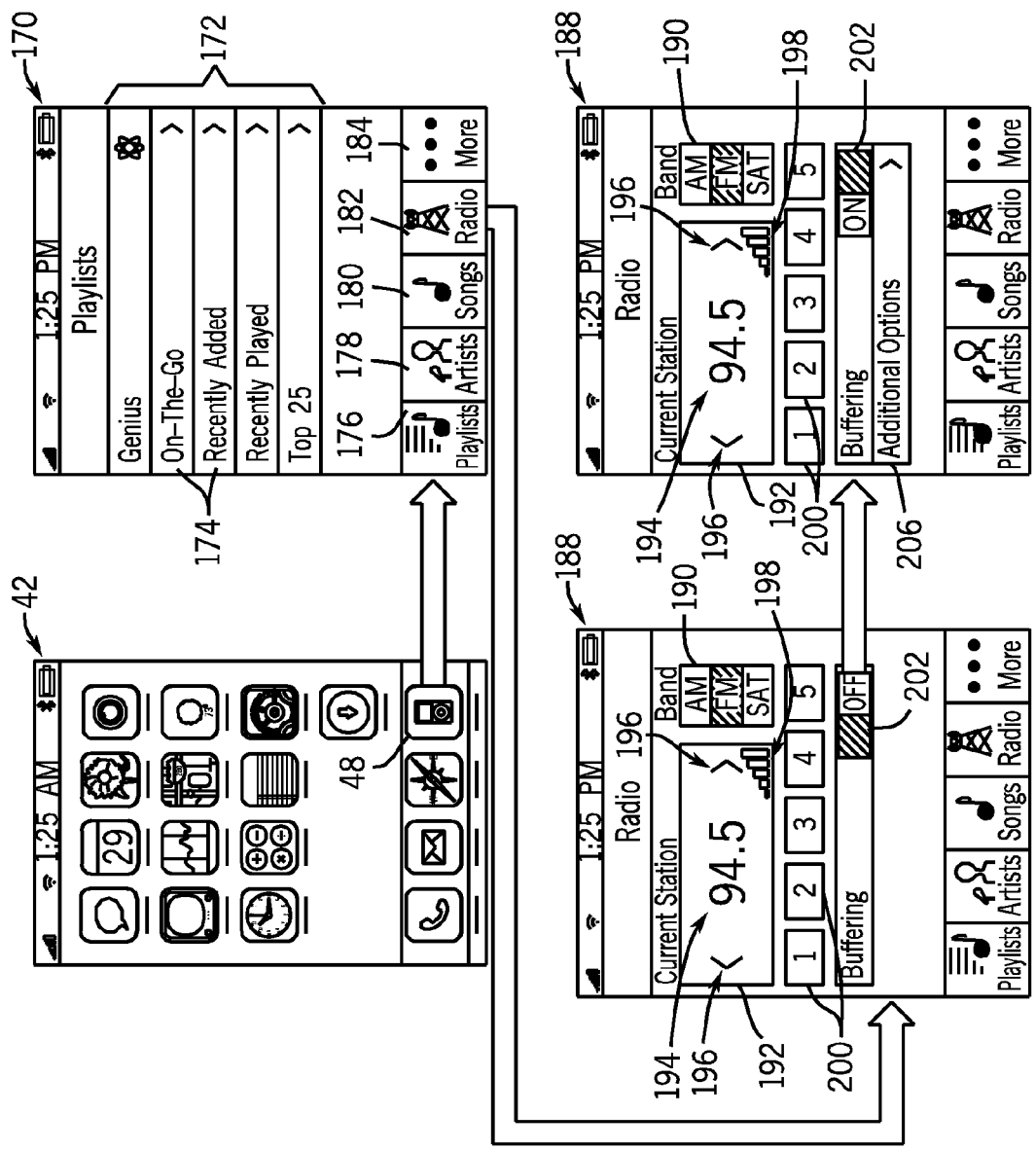
FIG. 9 shows a plurality of screens that may be displayed on the device of FIG. 2 showing the execution of a media player application that includes radio functions, in accordance with aspects of the present disclosure.
Figure 10A:
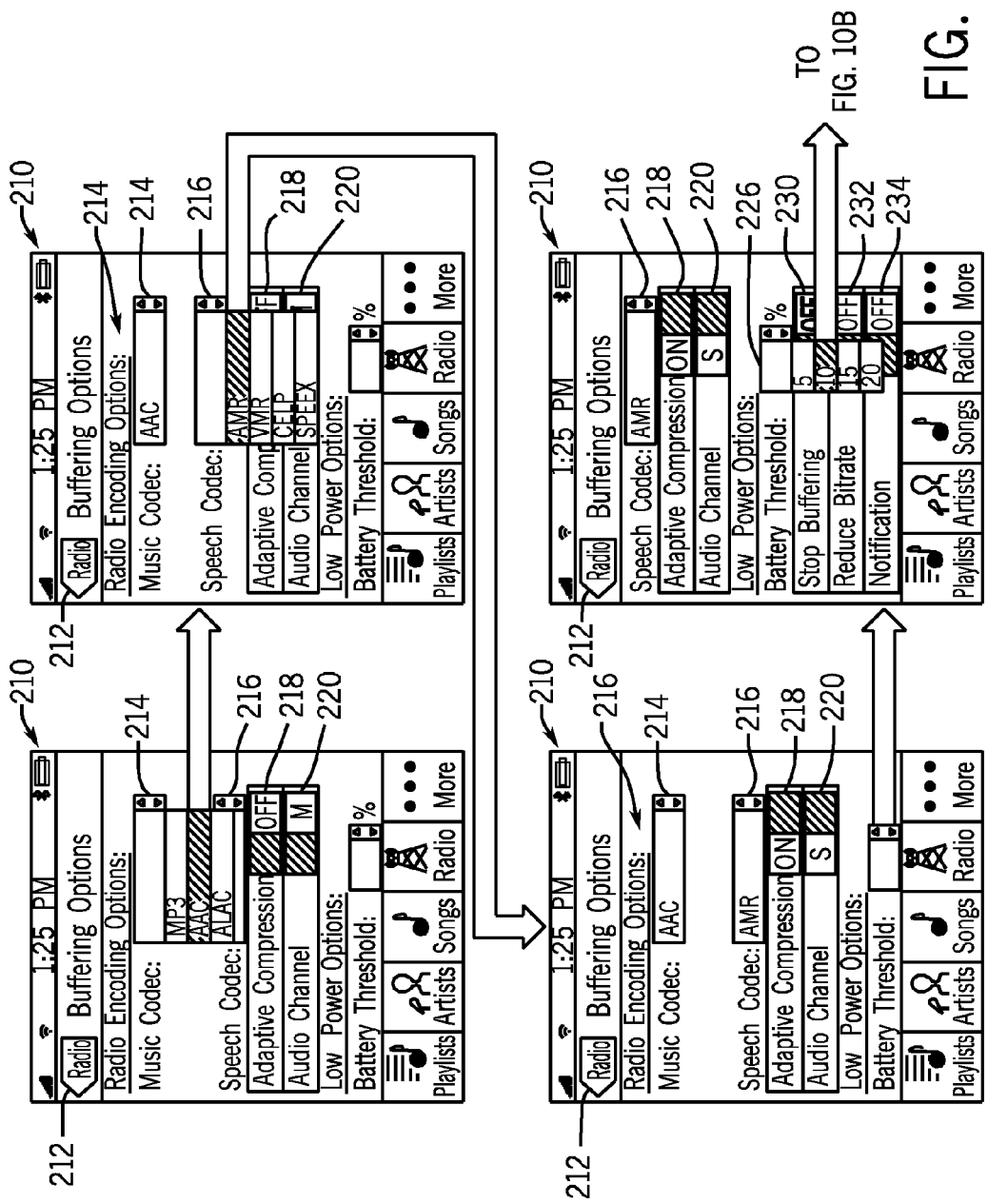
FIGS. 10A and 10B show a plurality of screens that may be displayed on the device of FIG. 2 illustrating how a user may configure various options relating to the adaptive encoding and compression of audio broadcast data received by the device of FIG. 2, in accordance with aspects of the present disclosure.
Figure 10B:
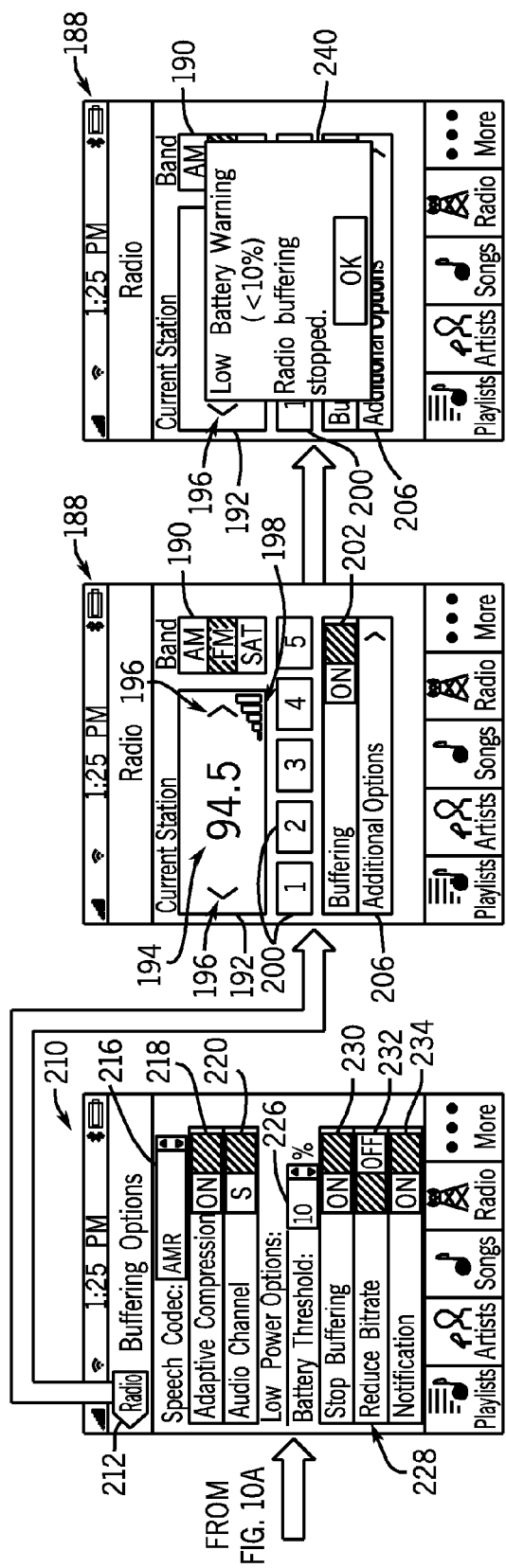
Figure 11:
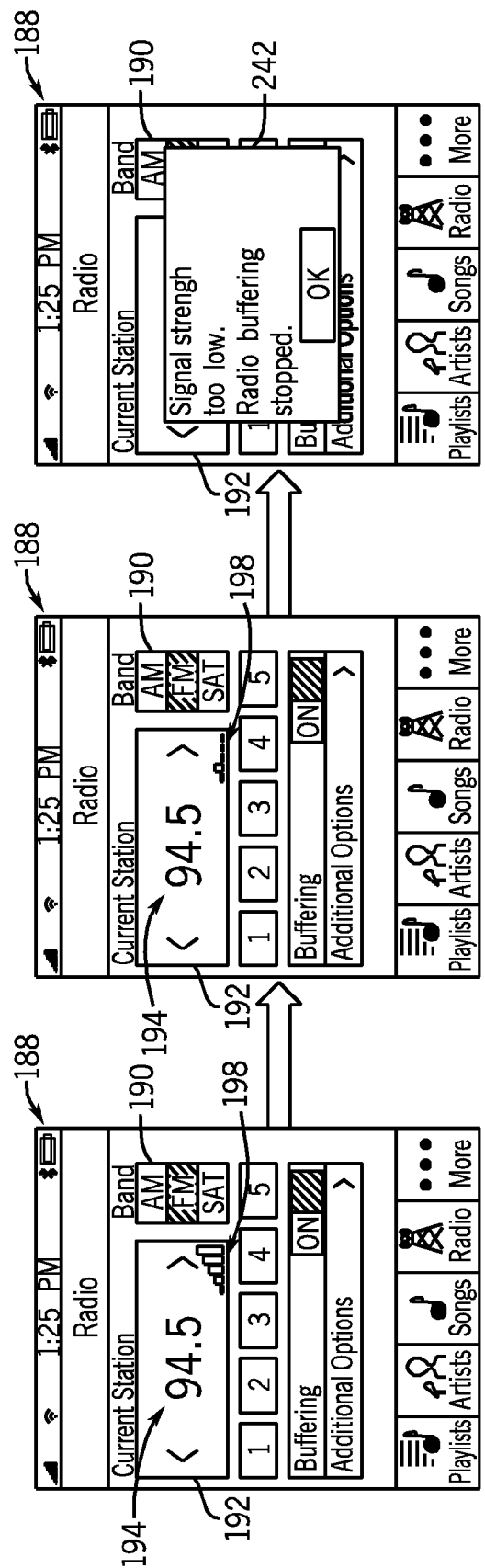
FIG. 11 shows a notification that may be displayed on the device of FIG. 2 when the signal strength of an audio broadcast signal falls below a particular threshold, in accordance with aspects of the present disclosure.

As discussed above, various user preferences 82, which may at least partially influence the encoding and compression of audio broadcast data 62, may be configured on electronic device 10. For instance, referring now to FIGS. 9-11, several exemplary user interface techniques for configuring user preferences relating to the encoding of broadcast data are illustrated, in accordance with aspects of the present disclosure. In particular, FIG. 9 illustrates the execution of a media player application on device 10 that provides for audio broadcast reception and tuning capabilities. FIGS. 10A, 10B, and 11 illustrate the configuration of various user preferences relating to the encoding and compression of audio broadcast data. As will be understood, the depicted screen images may be generated by GUI 45 and displayed on display 28 of device 38. For instance, these screen images may be generated as the user interacts with the device 38, such as via the input structures 14, or by a touch screen interface.

Additionally, it should be understood that GUI 45, depending on the inputs and selections made by a user, may display various screens including icons (e.g., 46) and graphical elements. These elements may represent graphical and virtual elements or "buttons" which may be selected by the user from display 28. Accordingly, it should be understood that the term "button," "virtual button," "graphical button," "graphical elements," or the like, as used in the following description of screen images below, is meant to refer to the graphical representations of buttons or icons represented by the graphical elements provided on display 28. Further, it should also be understood that the functionalities set forth and described in the subsequent figures may be achieved using a wide variety graphical elements and visual schemes. Therefore, illustrated embodiments are not intended to be limited to the precise user interface conventions depicted herein. Rather, additional embodiments may include a wide variety of user interface styles.

As initially shown in FIG. 9, beginning from home screen 42 of GUI 45, the user may initiate the media player application by selecting graphical button 48. By way of example, the media player application may be an iPod® application running on a model of an iPod Touch® or an iPhone®, available from Apple Inc. Upon selection of graphical button 48, the user may be navigated to home screen 170 of the media player application. As shown in FIG. 9, screen 170 may initially display listing 172 showing various playlists 174 stored on device 10. Screen 170 also includes graphical buttons 176, 178, 180, 182, and 184, each of which may correspond to specific functions. For example, if the user navigates away from screen 170, the selection of graphical button 176 may return the user to screen 170 and display playlists 174. Graphical button 178 may organize the media files stored on the device 38 and display the media files in groupings based upon artist names, whereas graphical button 180 may represent a function by which media files are sorted and displayed on the device 38 alphabetically in a listing that may be navigated by the user. Additionally, graphical button 182 may represent a radio application configured to provide for receiving and tuning of radio broadcast signals. Finally, graphical button 182 may provide the user with a listing of additional options that the user may configure to customize the functionality of device 38 and the media player application 48.

As shown, the selection of graphical button 182 may advance the user to screen 188, which displays a radio function. Screen 188 may include graphical element 190, which may allow the user to select a particular broadcast band, such as AM, FM, or even satellite broadcasting. Screen 188 further includes virtual display element 192, which may display the current station 194, tuning elements 196, as well as signal strength indicator 198. By manipulating the tuning elements 196, a user may change the current station 194 to which device 38 is tuned. Additionally, screen 188 includes a number of preset buttons 200, which may function as "short cuts" to preset radio stations. Thus, a user may quickly navigate to a desired station by selecting one of present buttons 200, rather than sequentially navigating through the available stations using tuning elements 196.

The radio function displayed on screen 188 may also provide for the configuration of various user preferences, such as preferences 82 discussed above (FIG. 3). For instance, the buffering and encoding of audio broadcast data may initially be disabled. By selecting graphical switch 202, a user may enable the buffering and encoding of audio broadcast data, and may further cause graphical list item 206 to appear, which may provide for the configuration of additional options, as will be discussed below with reference to FIGS. 10A and 10B.

Continuing to FIGS. 10A and 10B, the selection of list item 206 may advance the user to configuration screen 210. Screen 210 may include graphical button 212, which the user may select to return to screen 188. Screen 210 may include various configuration options relating to audio encoding. For instance, screen 210 may include drop-down menu 214, by which the user may select a preferred music codec, the selection being an AAC codec in the present example. The user may also select a preferred speech codec (e.g., AMR) through drop-down menu 216. Thus, based upon these selections, adaptive encoder/decoder logic 70 may utilize the AAC codec for encoding music broadcasts and the AMR codec for encoding speech broadcasts. Additionally, adaptive compression, which may include varying a compression bit-rated based on signal quality, may be enabled or disabled by toggling the graphical switch 218. Further, screen 210 may allow the user to select whether audio broadcast data is to be encoded using a single audio channel (mono) or multiple audio channels (stereo). For instance, the user may select graphical switch 220 to toggle this option.

Screen 210 also allows the user to define various preferences relating to low power conditions of device 10. For instance, screen 210 may include drop-down menu 226, by which a user may specify a low power threshold. In the present example, the user has indicated that certain low power operating measures should be implemented once the total remaining charge in power source 26 has decreased to 10 percent. Additionally, using the various low power options 228 displayed, the user has configured device 10 using graphical switches 230, 232, and 234 to stop buffering and encoding broadcast data and to display a low power notification when the low power threshold is reached. Thereafter, the user may select graphical button 212 on screen 210 to return to radio function screen 188. Based on the currently configured preferences, device 10 may simultaneously play and encode audio data broadcasted by current station 194. However, if the battery charge is depleted to a level that falls below the selected low power threshold (e.g., 10 percent), device 10 may stop encoding the audio broadcast data and may display the notification 240, in accordance with the configuration specified by the user.

Further, as discussed above, device 10 may also be configured to stop encoding audio broadcast data when a quality parameter, such as signal strength, falls below a minimum threshold. For instance, referring now to FIG. 11, signal indicator 198 may initially that the signal strength of the broadcast is high. However, due to various factors, such as a change in the position of device 10 relative to the broadcast source, the signal strength may vary. As shown in FIG. 11, once the signal strength 198 has fallen below the minimum threshold, the user may be notified that the encoding of the broadcast data has stopped by way of the notification message 242.

As will be understood, the various techniques described above and relating to the encoding and/or compression of audio broadcast data are provided herein by way of example only. Accordingly, it should be understood that the present disclosure should not be construed as being limited to only the examples provided above. Indeed, a number of variations of the adaptive encoding and compression techniques set forth above may exist. Additionally, various aspects of the individually described techniques may be combined in certain implementations. Further, it should be appreciated that the above-discussed adaptive encoding and/or compression techniques may be implemented in any suitable manner. For instance, audio broadcast processing logic 32, which may include adaptive encoder/decoder logic 70, may be implemented using hardware (e.g., suitably configured circuitry), software (e.g., via a computer program including executable code stored on one or more tangible computer readable medium), or via using a combination of both hardware and software elements.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method, comprising:
    receiving an audio broadcast signal on an electronic device;
    determining a plurality of characteristics of the audio broadcast signal comprising at least two of: metadata associated with the audio broadcast signal, a frequency concentration in the audio broadcast signal, or a signal quality of the audio broadcast signal;
    using the plurality of characteristics to determine a genre parameter and a quality parameter of the audio broadcast signal, wherein the quality parameter is determined from at least one of: quantity of white noise, signal strength, distortion level, or audio artifacts in the audio broadcast signal; and
    adaptively encoding the audio broadcast signal, comprising selecting a codec from a plurality of codecs and a compression bit-rate to encode the audio broadcast signal, based upon the genre parameter, the quality parameter, or both to generate a digital representation of the audio broadcast signal storable on the electronic device.

2. The method of claim 1, wherein determining the genre parameter of the audio broadcast signal comprises determining whether the audio broadcast signal contains speech data or music data, and wherein selecting the codec and encoding the audio broadcast signal using the selected codec comprises:

if the genre parameter indicates that the audio broadcast signal contains speech data, selecting a speech codec and encoding the audio broadcast signal using the selected speech codec; and if the genre parameter indicates that the audio broadcast signal contains music data, selecting a music codec and encoding the audio broadcast signal using the selected music codec.

3. The method of claim 2, wherein the speech codec is selected from one of an Adaptive Multi-Rate (AMR) codec, a Variable Multi-Rate (VMR) codec, a Code Excited Linear Prediction (CELP) codec, or a Speex codec, or any combination thereof, and wherein the music codec is selected from one of an Advanced Audio Coding codec, an Apple Lossless Audio Codec (ALAC), an Ogg Vorbis codec, or an MP3 codec, or any combination thereof.

4. The method of claim 2, wherein whether the audio broadcast signal contains music data or speech data is determined, at least in part, by analyzing the metadata associated with the audio broadcast signal.

5. The method of claim 4, wherein the metadata associated with the audio broadcast signal is obtained from a broadcast metadata signal comprising a Radio Data System (RDS) signal, an Amplitude Modulation Signaling System (AMSS) signal, a Program Associated Data (PAD) signal, or a Program Service Data (PSD) signal, or some combination thereof.

6. The method of claim 2, wherein whether the audio broadcast signal contains music data or speech data is determined, at least in part, by performing a frequency analysis to determine the frequencies at which audio data in the audio broadcast signal is most concentrated.

7. The method of claim 6, wherein the audio broadcast data is determined to contain speech data, at least in part, if the audio data in the audio broadcast signal is generally concentrated within a frequency range of between approximately 1000-6000 hertz.

8. The method of claim 6, wherein performing the frequency analysis comprises performing spectral or cepstral analysis, or some combination thereof.

9. The method of claim 1;
wherein one of the at least two of the plurality of characteristics of the audio broadcast signal comprises a metadata signal associated with the audio broadcast signal to determine a genre parameter.

10. The method of claim 9, wherein adaptively compressing the audio broadcast signal comprises selecting a compression bit-rate based at least partially upon the quality parameter.

11. The method of claim 10, comprising adjusting the selected compression bit-rate in response to a change in the quality parameter, wherein adjusting the compression bit-rate comprises reducing the compression bit-rate for the selected codec when the quality parameter indicates that the audio broadcast signal quality is poor.

12. The method of claim 11, wherein the change in the quality parameter is caused at least in part by a change in the position of the electronic device relative to the broadcast source.

13. The method of claim 12, wherein the broadcast source comprises one of a frequency modulation (FM) broadcast source, an amplitude modulation (AM) broadcast source, or a satellite broadcast source.

14. The method of claim 11, comprising not encoding or compressing the audio broadcast signal if the change in the quality parameter results in the quality parameter being below a minimum quality threshold level.

15. An electronic device, comprising:
an audio broadcast receiver configured to receive an audio broadcast signal;
processing logic configured to process the audio broadcast signal to generate a digital representation of the audio broadcast signal, wherein the processing logic comprises:
signal analysis logic configured to determine a plurality of characteristics of the audio broadcast signal comprising at least two of: metadata associated with the audio broadcast signal, a frequency concentration in the audio broadcast signal, or a signal quality of the broadcast signal, and to use the plurality of characteristics to determine a genre parameter and a quality parameter of the audio broadcast signal, wherein the quality parameter is determined from at least one of: quantity of white noise, signal strength, distortion level, or audio artifacts in the audio broadcast signal; and
encoder/decoder logic configured to select a codec from a plurality of codecs and a compression bit-rate based upon the genre parameter, the quality parameter, or both and to encode the audio broadcast signal based upon the selected codec to generate the digital representation of the audio broadcast signal; and
a storage device configured to store the digital representation of the audio broadcast signal.

16. The electronic device of claim 15, wherein the encoder/decoder logic is configured to select a speech codec if the determined genre parameter indicates that the audio broadcast signal is primarily speech data, and to select a music codec if the determined genre parameter indicates that the audio broadcast signal is primarily music data.

17. The electronic device of claim 16, wherein the encoder/decoder logic is configured to encode the audio broadcast signal in mono if the audio broadcast signal is primarily speech data and to encode the audio broadcast signal in stereo if the audio broadcast signal is primarily music data.

18. The electronic device of claim 16, comprising a display device, wherein the speech codec and the music codec are determined by a user of the electronic device via a configuration screen accessible through a graphical user interface displayable on the display device.

19. The electronic device of claim 16, wherein determining whether the audio broadcast signal is primarily speech or music data comprises using the signal analysis logic to extract program information from a broadcast metadata signal transmitted with the audio broadcast signal as a sub-carrier signal.

20. The electronic device of claim 15, wherein the encoder/decoder logic is additionally configured to select a compression bit-rate based at least partially upon the quality parameter.

21. The electronic device of claim 20, wherein the selection of the compression bit-rate is also based upon the genre parameter, wherein a first compression bit-rate is selected based upon the quality parameter and the genre parameter when the genre parameter indicates that the audio broadcast signal is primarily speech data, and wherein a second compression bit-rate is selected based upon the quality parameter and the genre parameter when the genre parameter indicates that the audio broadcast signal is primarily music data, wherein the first compression bit-rate is lower than the second compression bit-rate.

22. The electronic device of claim 20, wherein the compression bit-rate is reduced if the quality parameter indicates poor quality of the audio broadcast signal.

23. The electronic device of claim 15, comprising encryption logic configured to encrypt the digital representation of the audio broadcast signal prior to storage on the storage device.

24. The electronic device of claim 23, wherein the encryption logic is configured to encrypt the digital representation of the audio broadcast signal using an Advanced Encryption Standard (AES) format or a Data Encryption Standard (DES) format, or some combination thereof.

25. One or more tangible non-transitory computer-readable storage media having instructions encoded thereon for execution by a processor, the instructions comprising:
  code to determine a genre parameter of the audio broadcast signal, the genre parameter indicating whether the audio broadcast signal is primarily speech-based or music-based;
  code to determine a quality parameter of an audio broadcast signal;
  code to evaluate the quality parameter against at least one set of quality binning thresholds, wherein the at least one set of quality binning thresholds comprises a first set of quality binning thresholds and a second set of quality binning thresholds, and wherein the code to evaluate the quality parameter against the at least one set of quality binning thresholds comprises:
    code to evaluate the quality parameter against the first set of quality binning thresholds if the genre parameter indicates that the audio broadcast signal is primarily speech-based; and
    code to evaluate the quality parameter against the second set of quality binning thresholds if the genre parameter indicates that the audio broadcast signal is primarily music-based;
  code to select a compression bit-rate based upon the evaluation; and
  code to select a speech codec or a music codec based upon the genre parameter.

26. The one or more tangible non-transitory computer-readable storage media of claim 25, wherein the first set of quality binning thresholds represents bit-rates that are generally lower than the second set of quality binning thresholds.

27. The one or more tangible non-transitory computer-readable storage media of claim 25, comprising code to encode and compress the audio broadcast signal based upon the selection of the speech or music codec and the selection of the compression bit-rate.

28. One or more tangible non-transitory computer-readable storage media having instructions encoded thereon for execution by a processor, the instructions when executed performing operations comprising:
  receiving an audio broadcast signal;
  determining a plurality of characteristics of the audio broadcast signal comprising at least two of: metadata associated with the audio broadcast signal, a frequency concentration in the audio broadcast signal, or a signal quality of the broadcast signal, and to use the plurality of characteristics to determine a genre parameter and a quality parameter of the audio broadcast signal, wherein the quality parameter is determined from at least one of: quantity of white noise, signal strength, distortion level, or audio artifacts in the audio broadcast signal; and
  selecting a codec from a plurality of codecs and a compression bit-rate based upon the genre parameter, the quality parameter, or both and to encode the audio broadcast signal based upon the selected codec to generate the digital representation of the audio broadcast signal; and
  storing the digital representation of the audio broadcast signal in a storage device.

29. The one or more non-transitory computer-readable media of claim 28, wherein selecting a codec based upon the genre parameter comprises selecting a speech codec if the determined genre parameter indicates that the audio broadcast signal is primarily speech data, and selecting a music codec if the determined genre parameter indicates that the audio broadcast signal is primarily music data.

* * * * *